(12) United States Patent  
Sakakibara et al.

(10) Patent No.: US 9,120,015 B2  
(45) Date of Patent: Sep. 1, 2015

(54) PORTABLE ELECTRONIC DEVICE

(71) Applicant: Sony Computer Entertainment Inc., Tokyo (JP)

(72) Inventors: Kenji Sakakibara, Tokyo (JP); Takashi Sogabe, Tokyo (JP); Kazuya Wakabayashi, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 14/166,190

(22) Filed: Jan. 28, 2014

(65) Prior Publication Data

US 2014/0141885 A1    May 22, 2014

Related U.S. Application Data

(63) Continuation of application No. 13/355,824, filed on Jan. 23, 2012, now Pat. No. 8,696,471.

(30) Foreign Application Priority Data

Jan. 25, 2011    (JP) .................................. 2011-013470

(51) Int. Cl.
 *A63F 9/24*  (2006.01)
 *A63F 13/20*  (2014.01)
 *G06F 1/16*  (2006.01)
 (Continued)

(52) U.S. Cl.
 CPC .............. *A63F 13/06* (2013.01); *A63F 13/214* (2014.09); *A63F 13/92* (2014.09); *G06F 1/169* (2013.01); *G06F 1/1626* (2013.01); *G06F 1/1643* (2013.01); *G06F 1/1656* (2013.01)

(58) Field of Classification Search
 USPC ............. 463/1, 30–32, 34, 37, 40–42, 44–46; 345/156–179, 418, 419, 430, 467, 503
 See application file for complete search history.

(56) References Cited

U.S. PATENT DOCUMENTS 7,347,780 B1 *  3/2008  Best ................................ 463/37  
7,800,592 B2 *  9/2010  Kerr et al. ..................... 345/173  
(Continued)

FOREIGN PATENT DOCUMENTS

EP    1672973 A1    6/2006  
EP    1691263 A1    8/2006  
(Continued)

OTHER PUBLICATIONS

Office Action for corresponding KR Application No. 1020120007132 dated Apr. 30, 2013.
(Continued)

*Primary Examiner* — Sunit Pandya  
(74) *Attorney, Agent, or Firm* — Matthew B. Dernier, Esq.

(57) ABSTRACT

An electronic device (1) has hold parts (1R, 1L) constituting respective right and left side parts of the electronic device 1 and being available to be held by a user. Operating sticks (3R, 3L) are provided on the respective hold parts (1R, 1L). A rear touch panel (21) is provided on the rear surface of the electronic device (1). The rear touch panel (21) is provided in at least an area located further upward than a positions P opposite from the operation sticks (3R, 3L). This layout of the rear touch panel (21) allows a user to smoothly operate the rear touch panel (21) while holding the hold parts of the electronic device.

6 Claims, 11 Drawing Sheets

(51) Int. Cl.
*A63F 13/92* (2014.01)
*A63F 13/214* (2014.01)

(56) References Cited

U.S. PATENT DOCUMENTS

| | | | |
|---|---|---|---|
| 8,105,169 B2* | 1/2012 | Ogasawara et al. | 463/46 |
| 2002/0118175 A1* | 8/2002 | Liebenow et al. | 345/168 |
| 2003/0085870 A1 | 5/2003 | Hinckley | |
| 2003/0234768 A1 | 12/2003 | Nashida et al. | |
| 2006/0197750 A1* | 9/2006 | Kerr et al. | 345/173 |
| 2007/0202956 A1* | 8/2007 | Ogasawara et al. | 463/46 |
| 2007/0291015 A1 | 12/2007 | Mori | |
| 2008/0068356 A1 | 3/2008 | Zavoronkovs | |
| 2010/0056220 A1 | 3/2010 | Oh | |
| 2010/0214227 A1* | 8/2010 | Hsieh et al. | 345/169 |
| 2012/0087073 A1 | 4/2012 | Ogasawara | |

FOREIGN PATENT DOCUMENTS

| | | |
|---|---|---|
| EP | 2214073 A1 | 8/2010 |
| JP | 7088251 A | 4/1995 |
| JP | 9253332 A | 9/1997 |
| JP | 2000218048 A | 8/2000 |
| JP | 2007334827 A | 12/2007 |
| JP | 3138453 U | 1/2008 |
| JP | 2009189715 A | 8/2009 |
| KR | 20060088112 | 8/2006 |
| KR | 20070041276 | 4/2007 |
| WO | 2009126480 A2 | 10/2009 |

OTHER PUBLICATIONS

Examination Report for corresponding SG Application 201200524-5, dated Apr. 17, 2013.
Examination Report for corresponding EP Application 12000439.5-1858/2479636, dated May 24, 2013.
Office Action for corresponding JP Application No. 2011013470 dated Feb. 26, 2013.
Australian Examination Report for corresponding AU Application No. 2012200432, dated Jan. 11, 2013.
Office Action for corresponding U.S. Appl. No. 13/355,824, dated May 21, 2013.
European Search Report for corresponding EP Application No. 15000780.5-1972, dated Jul. 6, 2015.

* cited by examiner

PORTABLE ELECTRONIC DEVICE

CROSS-REFERENCE TO RELATED APPLICATION

The present application is a continuation of U.S. Ser. No. 13/355,824, allowed, which has a filing date of Jan. 23, 2012, and which claims priority from Japanese application JP2011-013470 filed on Jan. 25, 2011, the entire disclosures of which are hereby incorporated by reference into this application.

BACKGROUND OF THE INVENTION

1. Field of the Invention

The present invention relates to a portable electronic device, and in particular, to a technique for improving operability thereof.

2. Description of the Related Art

U.S. Patent Application Publication 2007/0202956 discloses a portable electronic device (specifically, a game device) which a user can operate while holding right and left side parts thereof. According to this type of electronic device, operative members such as an operation button and an operative stick are arranged to the left and right of a display area defined on the front surface.

SUMMARY OF THE INVENTION

In recent years, along with development of application software, electronic devices have come to be used for diversified purposes. Accordingly, the manners of operations to an electronic device has been required to be diversified. For example, some portable electronic devices have a touch panel on the front surface thereof.

According to one aspect of the present invention, a portable electronic device, includes a front surface having a display area; a hold part positioned to either right or left of the display area, constituting a right or left part of the electronic device, and being available to be held by a user; an operative member provided on the hold part and positioned on the front surface of the electronic device; and a rear touch panel provided on a rear surface of the electronic device. The rear touch panel is provided in at least an area located further upward than an opposite position from the operative member.

According to the above aspect of the present invention, a user can smoothly operate a rear touch panel with his/her finger placed on the rear surface of the electronic device, while holding the hold part of the electronic device to operate an operative member.

DETAILED DESCRIPTION OF THE INVENTION

Figure 1:
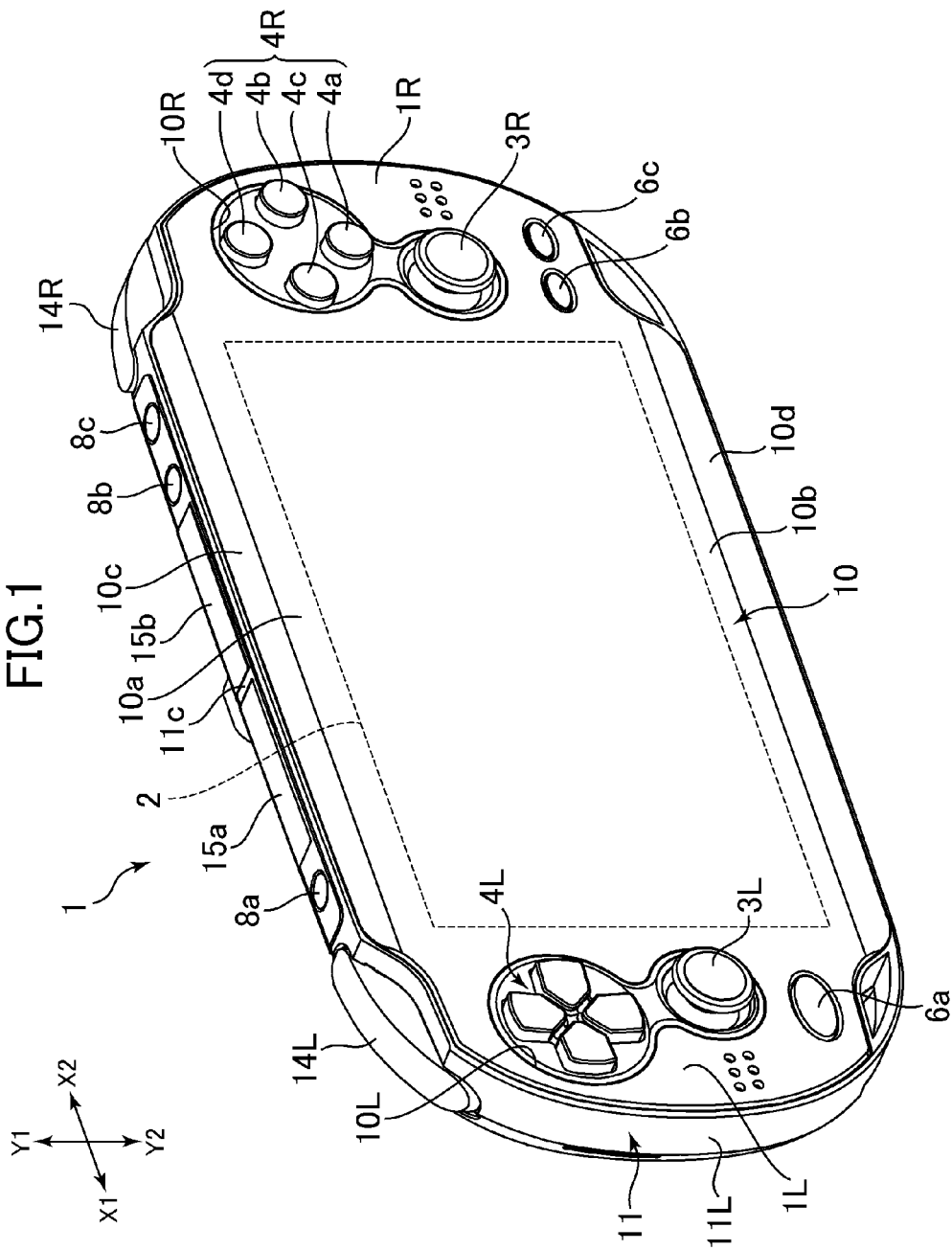
FIG. 1 is a perspective view of a portable electronic device according to an embodiment of the present invention, showing the front surface of the electronic device viewed diagonally.
Figure 2:
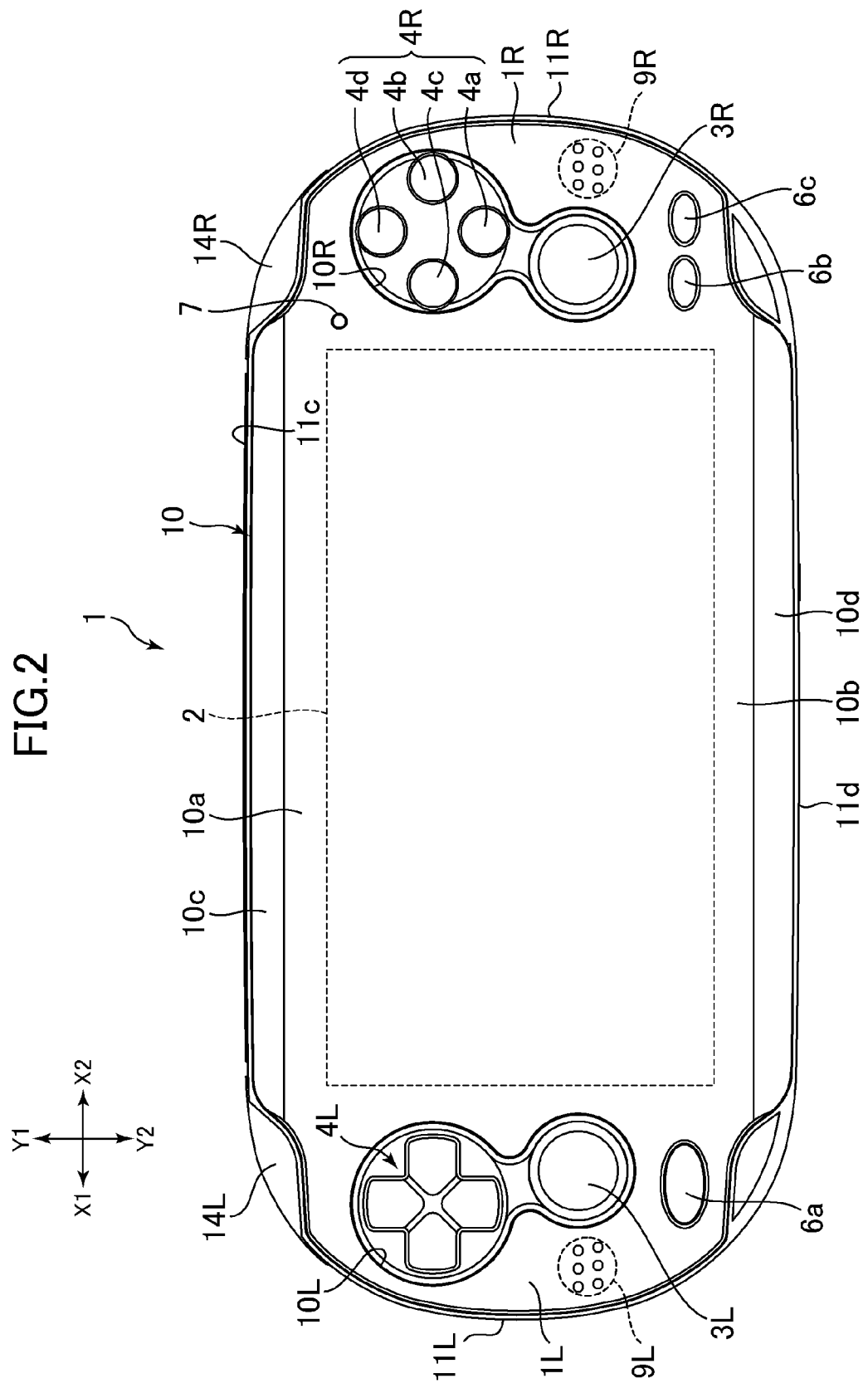
FIG. 2 is a front view of the electronic device.
Figure 3:
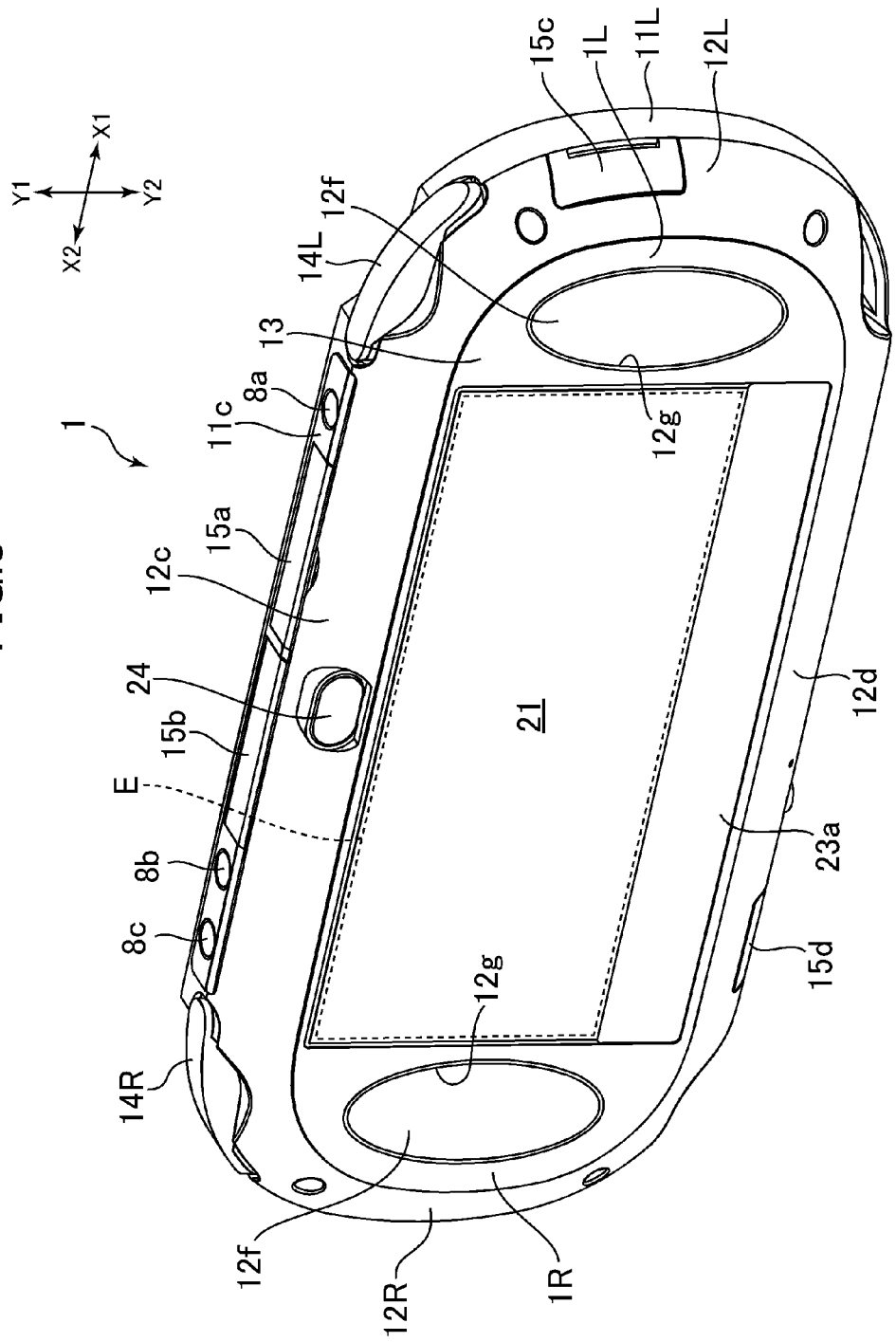
FIG. 3 is a perspective view of the electronic device, showing the rear surface of the electronic device viewed diagonally.
Figure 4:
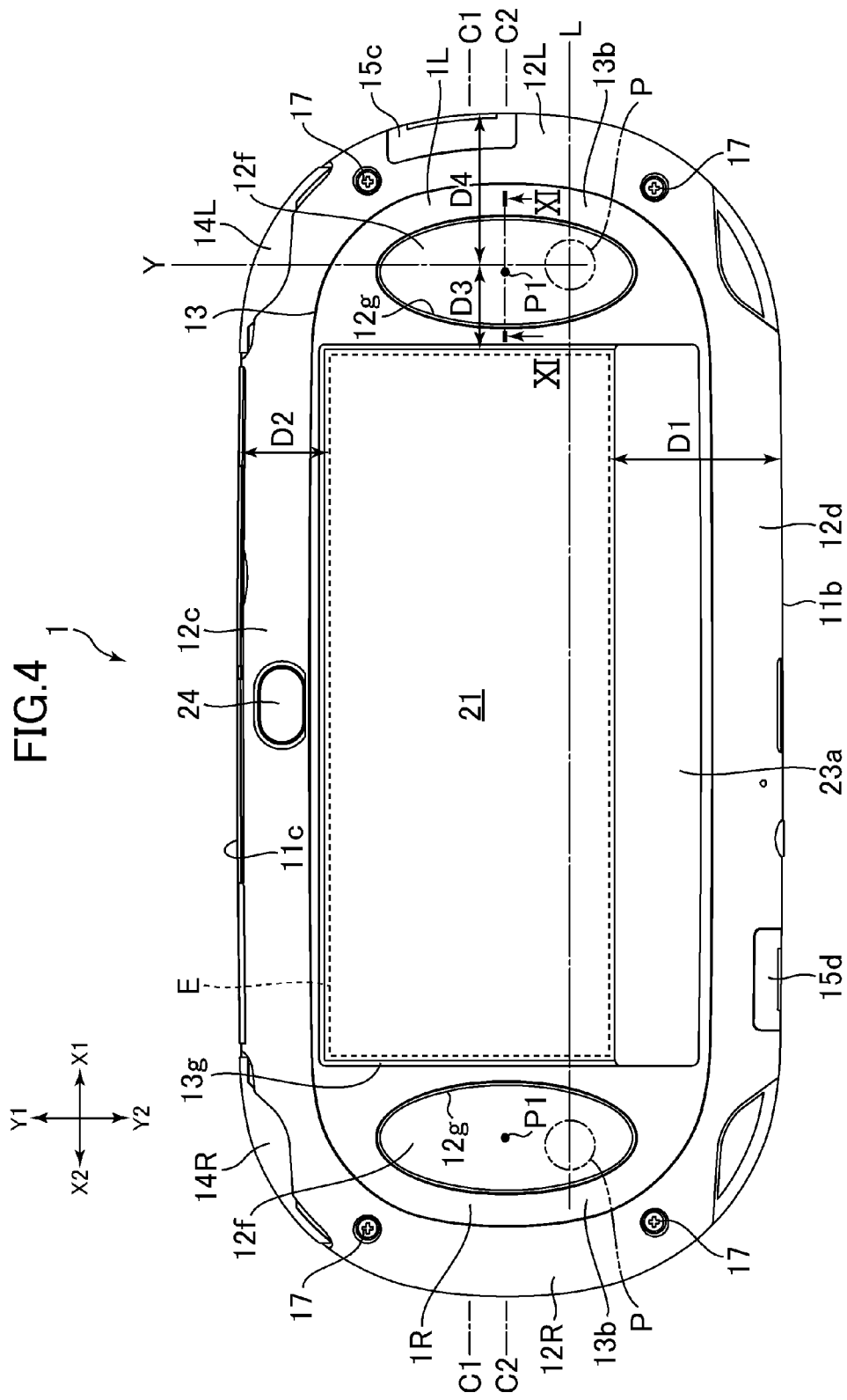
FIG. 4 is a rear view of the electronic device.
Figure 5:
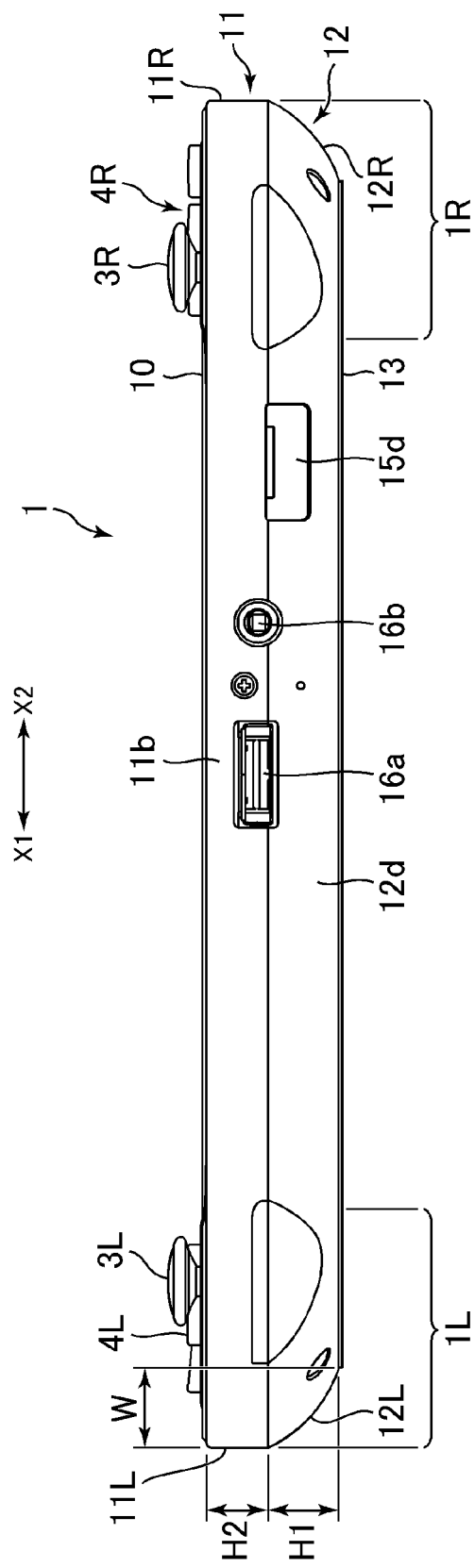
FIG. 5 is a bottom view of the electronic device.
Figure 6:
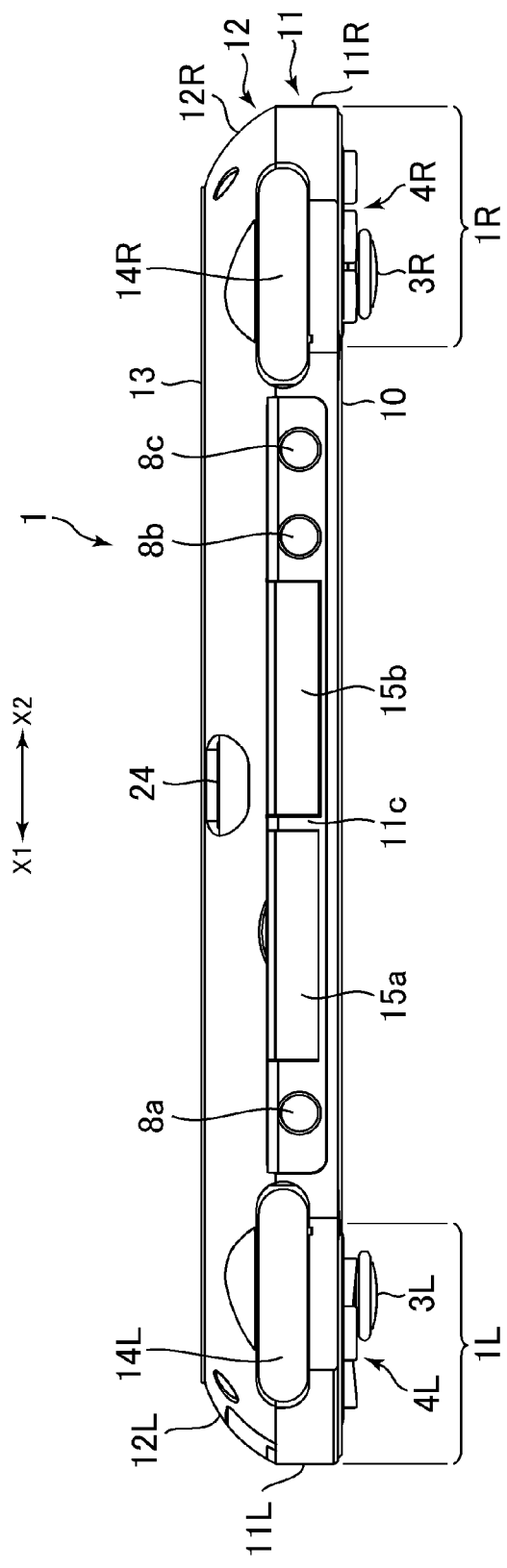
FIG. 6 is a top view of the electronic device.
Figure 7:
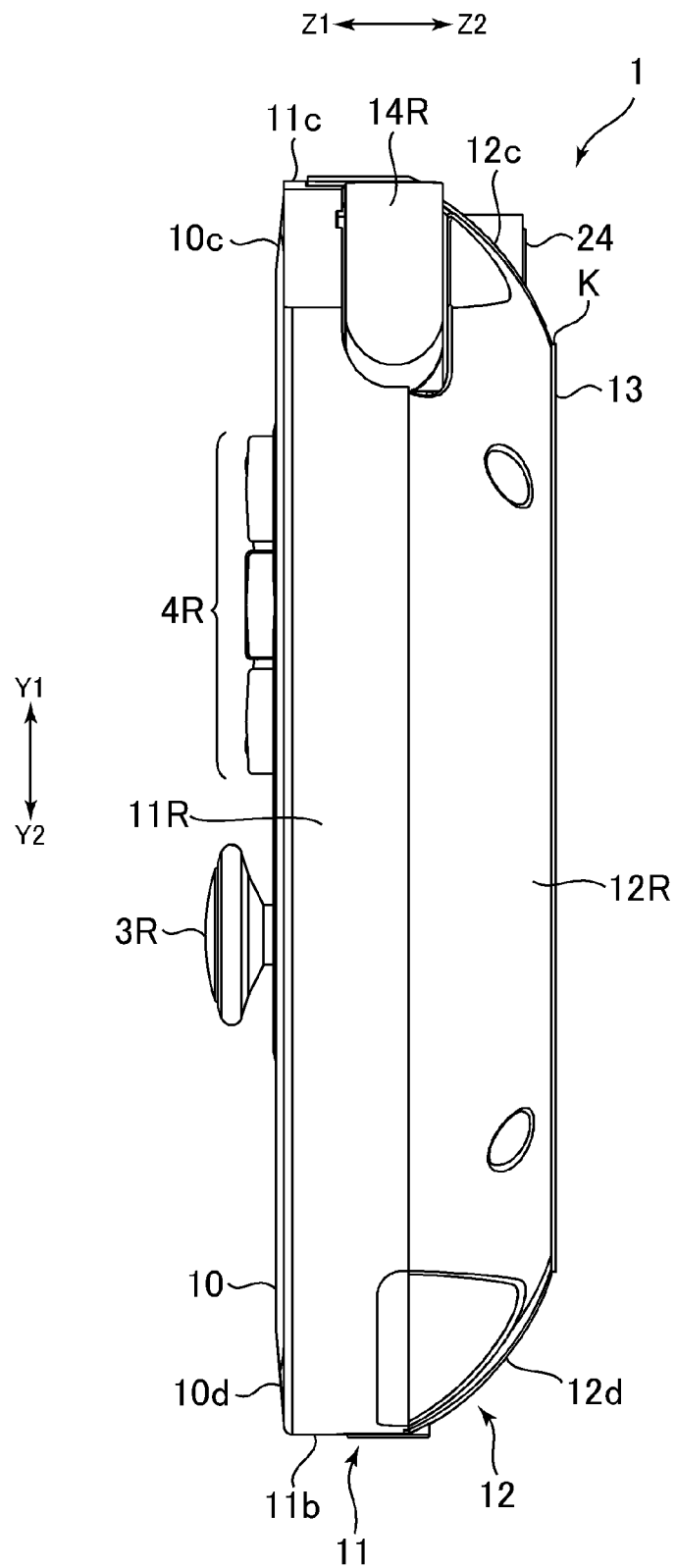
FIG. 7 is a right side view of the electronic device.
Figure 8:
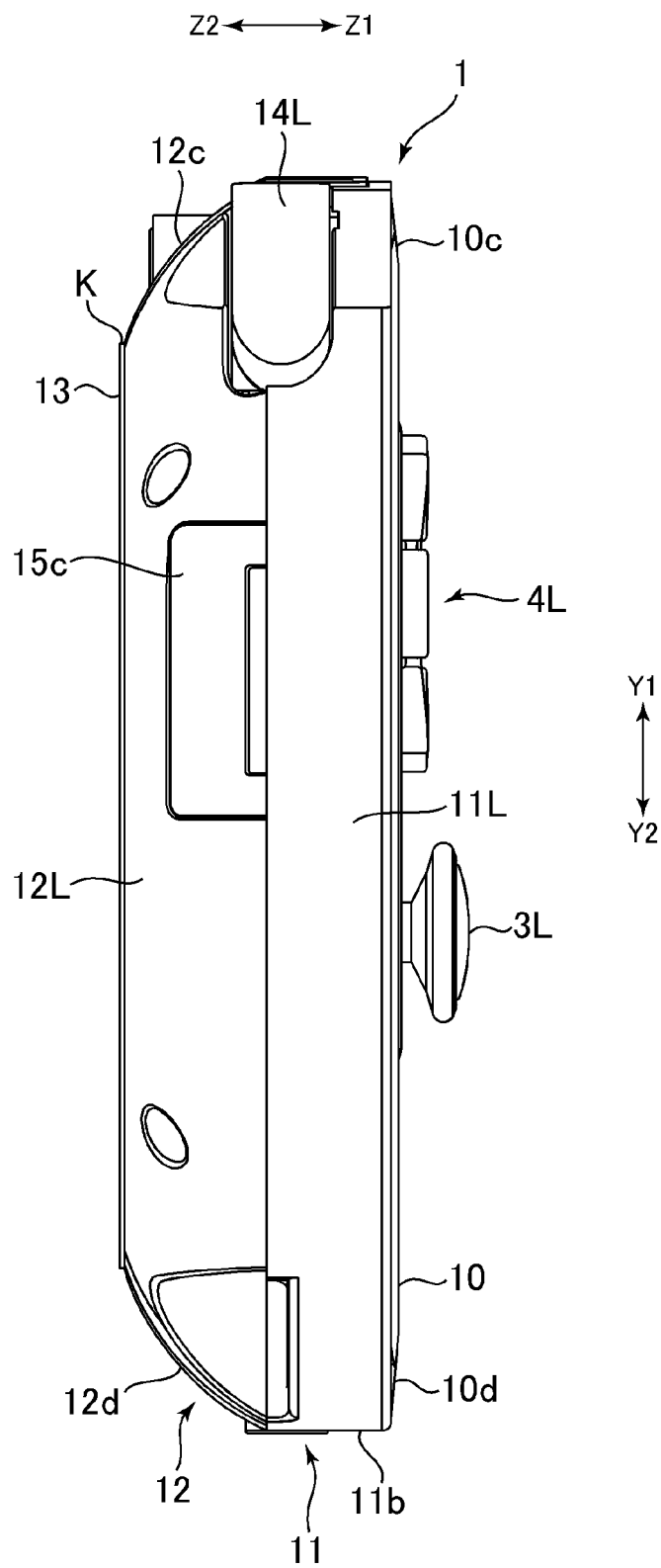
FIG. 8 is a left side view of the electronic device.
Figure 9:
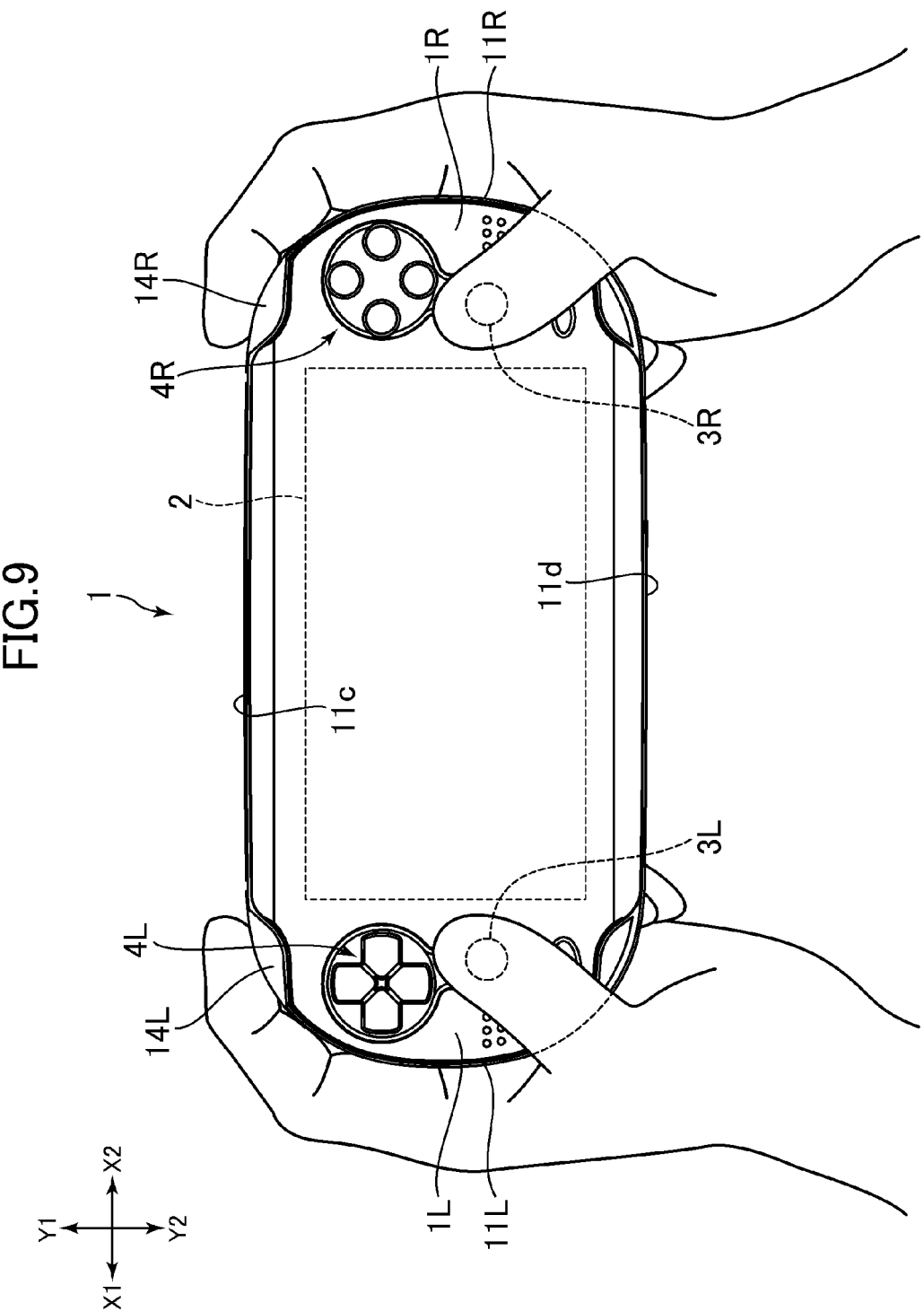
FIG. 9 is a diagram illustrating one manner of holding the electronic device 1 by a user, showing the front surface of the electronic device.
Figure 10:
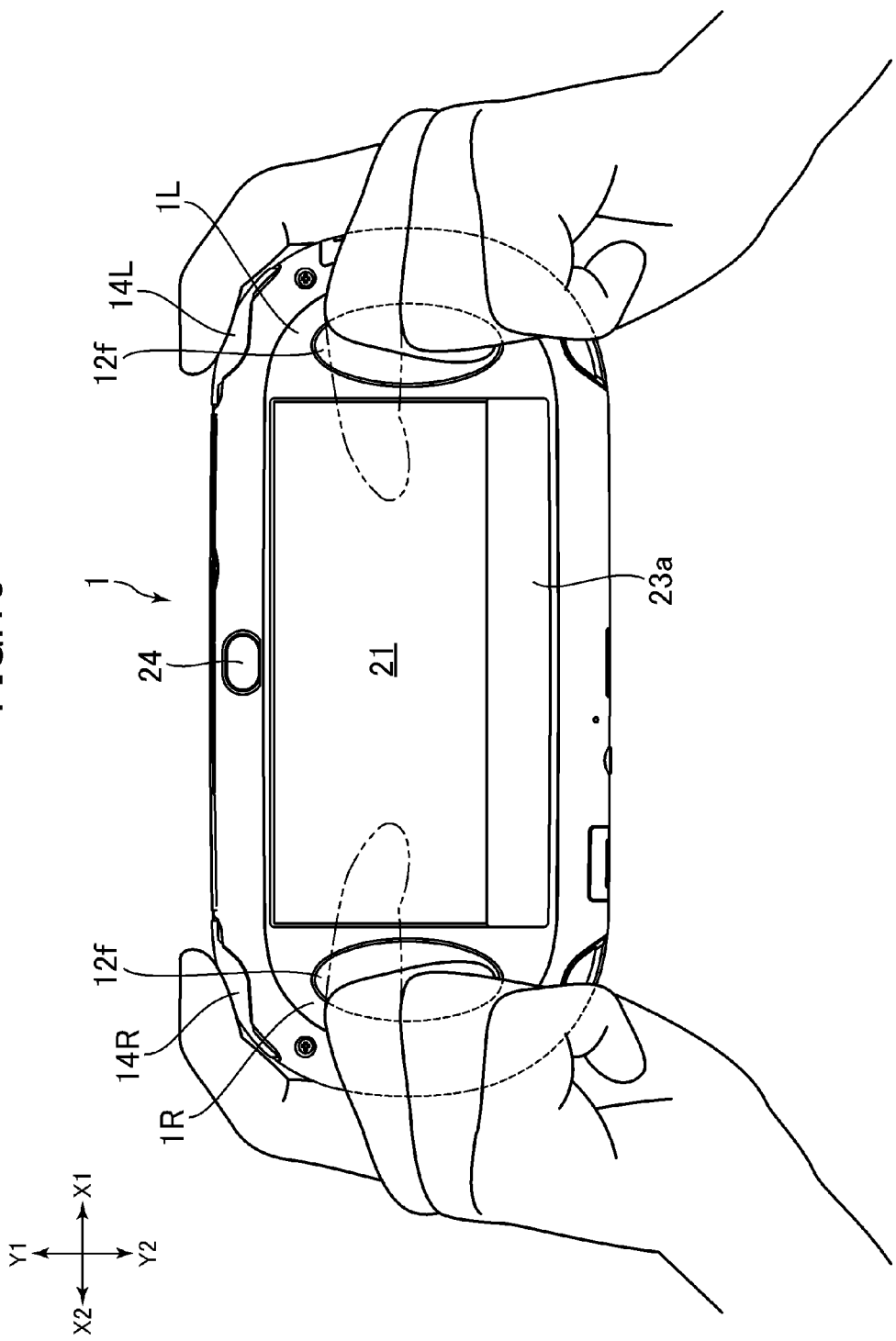
FIG. 10 is a diagram illustrating one manner of holding the electronic device 1 by a user, showing the rear surface of the electronic device.

In the following, one embodiment of the present invention will be described with reference to the accompanying drawings. FIG. 1 is a perspective view of a portable electronic device 1 according to an embodiment of the present invention, showing the front surface of the electronic device 1 viewed diagonally. FIG. 2 is a front view of the electronic device 1. FIG. 3 is a perspective view of the electronic device 1, showing the rear surface of the electronic device 1 viewed diagonally. FIG. 4 is a rear view of the electronic device 1. FIG. 5 is a bottom view of the electronic device 1. FIG. 6 is a top view of the electronic device 1. FIG. 7 is a right side view of the electronic device 1. FIG. 8 is a left side view of the electronic device 1. FIGS. 9 and 10 are diagrams illustrating one manner of holding the electronic device 1 by a user. Specifically, FIG. 9 shows the front surface of the electronic device 1 held by a user, and FIG. 10 shows the rear surface of the electronic device 1 held by a user.

In the following description, the direction indicated by X1-X2 is defined as a left-right direction in these diagrams, the direction indicated by Y1-Y2 is defined as an up-down direction. Further, a "lower side (lower, below)" of the electronic device 1 refers to the side toward a user holding the electronic device 1, and an "upper side (upper, above)" of the electronic device 1 refers to the opposite side from the "lower side".

The electronic device 1 is, e.g., a game device, a personal digital assistant (PDA), and so forth. The electronic device 1 has a sound reproducing function, a motion picture reproducing function, a radio or wired communication function or the like. As shown in FIGS. 1 and 2, the electronic device 1 has a substantially rectangular display area 2 provided on and positioned in a substantially center of the front surface thereof. The electronic device 1 has hold parts 1R, 1L formed to the left and right of the display area 2, respectively, which a user can hold with his/her hands. According to one manner in using the electronic device 1, a user sandwiches the hold parts 1R, 1L with his/her thumbs and middle fingers or the like, to thereby hold the electronic device 1 (see FIGS. 9 and 10).

The electronic device 1 has a shape that is long in the left-right direction. As shown in FIG. 2, the left and right edges of the electronic device 1 (that is, the edges of the hold parts 1R, 1L) has a substantially semi-circular shape in the front view of the electronic device 1, and thus the electronic device 1 has a curved right side surface 11R and a curved left side surface 11L. That is, the electronic device 1 has a substantially round shape that is long in the left-right direction in the front view thereof.

As shown in FIGS. 9 and 10, in many cases, a user places his/her index fingers along the right side surface (the right side surface of the front housing 11 to be described later) 11R and the left side surface (the left side surface of the front housing 11) 11L of the same. Note that a rear touch panel 21 is provided on the rear surface of the electronic device 1 (see FIG. 4), as to be described later. The fingers placed along the side surfaces 11R, 11L are moderately bent as the right side surface 11R and the left side surface 11L of the electronic device 1 are curved. Consequently, a user can more readily operate the rear touch panel 21 with his/her finger (e.g., the middle finger) placed on the rear surface, while holding the hold parts 1R, 1L, compared to a case in which the right side surface 11R and the left side surface 11L are flat surfaces extending in the up-down direction. That is, a user can readily remove his/her finger rightward or leftward from the touch panel 21, and also extend his/her finger to touch the rear touch panel 21.

The display area 2 is provided with a display device and a touch panel (a panel-like position input device) arranged on the display device. The display device is, e.g., a liquid crystal display device, a plasma display device, an organic EL display device, a field emission display device, or the like. The touch panel is, e.g., an electrostatic capacity-type touch panel. In this example, a front cover panel 10 is attached on the outermost surface of the touch panel, covering the substantially entire front surface of the electronic device 1. The display area 2 defined in the front cover panel 10 is flush with the area surrounding the display area 2 (that is, no step is formed in the boundary between the display area 2 and the surrounding area). In use of the electronic device 1, a game image, a motion image, a static image (e.g., a photograph, a pattern, a menu image showing a list of items selectable by a user), and so forth are shown in the display area 2. A user can select a desired item and move an object shown in the game image by touching the display area 2 with his/her finger. Note that the touch panel is not limited to an electrostatic capacity type, and may be, e.g., a resistive film type instead.

The electronic device 1 includes a housing accommodating a battery (not shown), a circuit board (not shown) where a CPU (Central Processing Unit) or the like is mounted. As shown in FIG. 7, the housing in this example includes a front housing 11 and a rear housing 12. The front housing 11 is like a box with the rear surface thereof open. The rear housing 12 is like a box with the front surface thereof open. The front housing 11 covers the front side of the rear housing 12, and is fixed to the rear housing 12. In this example, the front housing 11 and the rear housing 12 are fixed to each other using a plurality of screws 17 provided on the outer circumferential part thereof (see FIG. 4). The above described circuit board or the like is placed in the space enclosed by the front housing 11 and the rear housing 12. The housings 11, 12 are made of, e.g., resin.

As shown in FIG. 2, the front cover panel 10 constituting the front surface of the electronic device 1 has an external shape substantially identical to that of the electronic device 1, and is attached on the front surface of the front housing 11. The display device and the touch panel provided to the display area 2 are arranged on the rear side of the front cover panel 10. For example, an opening corresponding to the display area 2 is formed on the front housing 11, and the display device and the touch panel is placed in the opening of the front housing 11.

As shown in FIGS. 1 and 2, the electronic device 1 includes a plurality of operative members provided on the hold parts 1R, 1L, projecting from the front surface of the electronic device 1 and available to operation by a user. Specifically, the electronic device 1 in this example includes an operative stick 3R provided on the right hold part 1R and an operative stick 3L provided on the left hold part 1L as the operative members defined in claims. The operative sticks 3R, 3L are positioned on and projecting from the front surface of the electronic device 1 (more specifically, the surface of the front cover panel 10) (see FIGS. 7 and 8). The heads of the operative sticks 3R, 3L are formed into disk shape, and each operative stick 3R, 3L has a bar (stem) extending from the head thereof toward inside of the electronic device 1. The stem of each operative stick 3R, 3L is projecting forward from the front surface of the electronic device 1. Each operative stick 3R, 3L can be inclined in the radius directions around the stem. In other words, each operative stick 3R, 3L can be inclined toward every position in the circumferential direction around the stem. In another embodiment for use, each operative stick 3R, 3L can rotate in the circumferential direction around the stem, while remaining inclined. Each operative stick 3R, 3L is an analogue stick, and therefore outputs a signal according to the direction in which the operative stick 3R, 3L is inclined and the angle of inclination. Note that, however, the movement of the operative sticks 3R, 3L is not limited to the above described movements, and the operative sticks 3R, 3L may be supported slidable in the radius directions.

As shown in FIG. 2, buttons 4R are further provided on the right hold part 1R. The buttons 4R are positioned on the front surface of the electronic device 1. The buttons 4R include a plurality of (specifically four) buttons 4a, 4b, 4c, and 4d, which are positioned on the respective ends of across shape. The buttons 4a, 4b, 4c, 4d are projecting from the front surface of the electronic device 1 (see FIG. 7). In addition, a directive key 4L is provided on the left hold part 1L. The directive key 4L has a plurality of (specifically four) convex portions that together constitute a cross shape as a whole. The directive key 4L as well is positioned on the front surface of the electronic device 1. The convex portions constituting the directive key 4L are projecting from the front surface of the electronic device 1 (see FIG. 8). Openings 10R, 10L are formed on the respective right and left parts of the front cover panel 10. The opening 10R is formed such that the inner edge thereof surrounds the area where the operative stick 3R and the buttons 4R are located, and similarly, the opening 10L is formed such that the inner edge thereof surrounds the area where the operative stick 3L and the directive key 4L are located.

As shown in FIG. 2, the buttons 4R and the directive key 4L are positioned more upper and more outward in the left-right direction than the operative sticks 3R, 3L, respectively. That is, the center position among the buttons 4R is positioned more rightward than the right operative stick 3R. The center position among the directive key 4L is positioned more leftward than the left operative stick 3L.

As shown in FIG. 9, in many cases, a user places his/her thumbs on the operative sticks 3R, 3L and middle fingers or the like on the rear surface of the electronic device 1 (the rear surfaces of the hold parts 1R, 1L) to thereby hold the hold parts 1R, 1L. Then, in using the electronic device 1, a user moves his/her thumb diagonally toward the buttons 4R or the directive key 4L when necessary. Because the buttons 4R and the directive key 4L are positioned diagonally from the operative sticks 3R, 3L, a user can readily move his/her thumbs toward the buttons 4R and the directive key 4L.

As shown in FIG. 2, the positions of the operative sticks 3R, 3L, the buttons 4R, and the directive key 4L are offset upward as a whole on the front surface of the electronic device 1. That is, the distance from the center of each operative stick 3R, 3L to the lower edge of the front surface of the electronic device 1 is larger than the distance from the center of the buttons 4R or the directive key 4L to the upper edge of the front surface of the electronic device 1. Therefore, the center of gravity of the electronic device 1 is positioned closer to a user, compared to an arrangement in which the operative sticks 3R, 3L, the buttons 4R, and the directive key 4L are offset downward, and which enables a user to stably holding the electronic device 1.

As shown in FIG. 1 or 2, a plurality of (three in this example) buttons 6a, 6b, 6c are further provided on the front surface of the electronic device 1. The buttons 6a, 6b, 6c are less used during executing an application software in the electronic device 1 (e.g., during playing a game), compared to the above described operative sticks 3R, 3L, the buttons 4R, and the directive key 4L. The button 6a is, e.g., a home button for returning an image shown in the display area 2 to the initial image. The buttons 6b, 6c are, e.g., a select button for selecting an item shown in the display area 2, a start button for starting execution of an application software, and so forth. The buttons 6a, 6b, and 6c may have a built-in light emitting element such as an LED (light emitting diode) or the like. A light emitting element may be used to report a user about a status of the electronic device 1 (power on/off, receiving data via a radio communication function).

As shown in FIG. 2, the buttons 6a, 6b, 6c are positioned below the operative sticks 3R, 3L. In detail, the button 6a is positioned below the operative stick 3L, while the buttons 6b, 6c are positioned below the operative stick 3R, being arranged side by side in the left-right direction. The surface of the buttons 6a, 6b, 6c are lower in height from the front surface than the top surface (upper end) of the operative sticks 3R, 3L. This arrangement can prevent erroneous touching the buttons 6a, 6b, 6c by a user's finger while the user is operating the respective operative stick 3R, 3L. In this example, the surfaces of the buttons 6a, 6b, 6c are flush with the front surface (the surface of the front cover panel 10) of the electronic device 1.

As shown in FIG. 2, the above described buttons provided on the front surface of the electronic device 1 are all positioned in an area other than the upper side area and the lower side area of the display area 2. Specifically, in this example, the operative sticks 3R, 3L, the buttons 4R, and the directive key 4L are positioned to the right or left of the display area 2. The left button 6a is positioned away to the left of the display area 2. The button 6b, 6c are positioned away to the right of the right edge of the display area 2. With this positioning, a user can prevented from erroneously touching any button provided on the front surface with his/her finger when moving the finger up and down on the display area 2 (e.g., when scrolling an image).

As shown in FIG. 2, a flat surface (that is, a surface without a concave or a convex, hereinafter referred to as an upper flat surface) 10a continuing from the surface of the area of the display area 2 is formed further upward than the area where the display area 2 is located. Moreover, a flat surface (that is, a surface without a concave or a convex, hereinafter referred to as a lower flat surface) 10b continuing from the front surface of the area of the display area 2 is formed further downward than the area where the display area 2 is located. The upper flat surface 10a and the lower flat surface 10b enable a user to smoothly move his/her finger up and down on the display area 2. Note that the upper flat surface 10a and the lower flat surface 10b reach the upper and lower edges of the front surface of the electronic device 1, respectively, and have a larger left-right width than that of the display area 2.

As shown in FIGS. 7 and 8, the upper flat surface 10a includes a slop surface 10c in the uppermost part thereof. Specifically, the slop surface 10c extends upward being inclined toward the front, so that the upper edge of the slop surface 10c is flush with the edge of the upper surface 11c of the electronic device 1. Similarly, the lower flat surface 10b includes a slop surface 10d in the lowermost part thereof. The slope surface 10d extends downward being inclined toward the front, so that the lower edge of the slop surface 10d is flush with the edge of the lower surface 11b of the electronic device 1. This structure prevents a finger moving largely up and down on the display area 2 from being caught on the edge of the electronic device 1.

As shown in FIG. 2, a camera 7 is provided on the front surface of the electronic device 1. The camera 7 is used, e.g., to capture an image of a user holding the electronic device 1. The position of the camera 7 is offset toward one side relative to the center line in the left-right direction of the electronic device 1. In this example, the camera 7 is positioned on the hold part 1R. This arrangement can reduce movement of the camera 7 when a user holds the hold part 1R. Further, the camera 7 is positioned avoiding the display area 2 and the upper area (the upper flat surface 10a) and the lower area (the lower flat surface 10b) than the display area 2. This can prevent the surface of the camera 7 from getting dirt. Note that the camera 7 may be positioned on the hold part 1L.

As shown in FIG. 2, speakers 9R, 9L are provided to the front side of the electronic device 1. The speakers 9R, 9L are arranged on the rear side of the front cover panel 10. A plurality of holes are formed on the front cover panel 10 in positions corresponding to the respective speaker 9R, 9L so that sound can be output through the holes. The speakers 9R, 9L are positioned avoiding the display area 2 and the upper area (the upper flat surface 10a) and the lower area (the lower flat surface 10b) than the display area 2. This can prevent the holes formed on the speakers 9R 9L from getting dirt.

The speakers 9R, 9L are positioned further outward in the left-right direction than the operative sticks 3R, 3L, respectively. That is, the right side speaker 9R is positioned to the right of the operative stick 3R. The left side speaker 9L is positioned to the left of the operative stick 3L. Because each operative stick 3R, 3L projects from the front surface of the electronic device 1, clearance is ensured between a user's finger placed on the respective operative stick 3R, 3L and the respective speaker 9R, 9L. This can prevent the finger from blocking the sound output from the speakers 9F9L from spreading.

The electronic device 1 has a rear surface, which is an opposite surface from the front surface thereof. As shown in FIGS. 3 and 4, a rear touch panel 21 (touch pad), that is, panel-like position input device, is provided on the rear surface of the electronic device 1. The broken line E in FIG. 4 outlines the outer shape of the rear touch panel 21. As outlined by the broken line E, the rear touch panel 21 is substantially rectangular.

In this example, a rear cover panel 13 that is larger in size than the rear touch panel 21 is placed on the outermost surface of the rear touch panel 21, and the surface of the area of the rear touch panel 21 is flush with the area surrounding the rear touch panel 21. Moreover, a hard coat layer is formed on the entire surface of the rear cover panel 13. As shown in FIG. 3 or 4, the outer shape of the rear cover panel 13 corresponds to the shape of the area inside the curved surfaces (surfaces with numerals 12L, 12R, 12c, 12d) formed on the outer circumferential part of the rear surface of the electronic device 1. Specifically, the rear cover panel 13 has a substantially ellipse shape that is long in the left-right direction. The rear cover panel 13 is attached on the outer surface of the rear housing 12. The touch panel 21 is arranged on the inner surface of the rear cover panel 13. For example, an opening is formed on the rear housing 12, and the rear touch panel 21 is placed in the opening of the rear housing 12. Note that, the size of the rear cover panel 13 is not limited to the above described size, and may be a size corresponding to the detection area of the rear touch panel 21. Further, the rear touch panel 21 is not limited to an electrostatic capacity type, but various types are usable. For example, the rear touch panel 21 may be of a resistive film type.

The rear touch panel 21 can be used, e.g., as described below. A user may move his/her finger on the rear touch panel 21 to thereby scroll an image shown on the display area 2 (see FIG. 10). Further, a user may touch, e.g., a point on the rear touch panel 21 to thereby select or move an object shown at the position on the display area 2 corresponding to the point.

As shown in FIG. 4, the rear touch panel 21 is located in an area (an area outlined by the broken line E) closer to the center in the left-right direction than the positions on the rear surface opposite from the operative sticks 3R, 3L (hereinafter referred to as a stick position P). Specifically, in this example, the rear touch panel 21 is positioned closer to the center in the left-right direction than the hold parts 1R, 1L, that is, located in the area between the left and right hold parts 1R, 1L. This arrangement prevents a user from erroneously touching the rear surface panel 21 with his/her finger, while holding the hold parts 1R, 1L (that is, while the user's middle finger is placed on the rear surface of the hold parts 1R, 1L) (see FIG. 10). In this example, the rear touch panel 21 is positioned between the opposite position from the buttons 4R and the opposite position from the directive key 4L.

As shown in FIG. 4, the rear touch panel 21 is provided in an area located further upward than the stick position P. In most of the time, a user places his/her thumbs on the operative sticks 3R, 3L and his/her middle fingers or the like on the rear surface, to thereby hold the hold parts 1R, 1L, as described above (see FIGS. 9 and 10). When the user extends his/her middle finger or the like while holding the hold parts 1R, 1L, the user's finger is naturally positioned further upward than the stick position P. In this embodiment, because the rear touch panel 21 is located further upward than the stick position p, the user can readily operate the rear touch panel 21 with his/her middle finger, while holding the hold parts 1R, 1L.

In this example, a button 14R is provided at the rightmost position of the top surface 11c, and a button 14L is provided at the leftmost position of the top surface 11c Accordingly, a user generally rests his/her thumbs on the respective operative sticks 3R, 3L, and his/her index fingers at the corners (that is, on the buttons 14R, 14L in this example) of the electronic device 1 so that the user can immediately press the buttons 14R, 14L when necessary. Depending on the application software carried out in the electronic device 1, this positioning may be a basic manner of holding the electronic device 1. The area of the rear touch panel 21 is designed such that a user holding the electronic device 1 in this manner can operate the rear touch panel 21 with his/her middle finger. Specifically, as shown in FIG. 4, the distance D3 from the straight line Y in the up-down direction passing the center of the stick position P and the respective button 14R, 14L to the respective left/right edge of the rear touch panel 21 is shorter than the distance D4 from the straight line Y to the respective left/right edge of the electronic device 1. This is, the right and left edge of the touch panel 21 is comparatively close to the stick position P. Moreover, the upper edge of the rear touch panel 21 is positioned further upward than the center between the stick position P and the buttons 14R, 14L. That is, the upper edge of the touch panel 21 is comparatively close to the buttons 14R, 14L. According to this arrangement, a user can easily touch the rear touch panel 21 with his/her middle finger while holding the electronic device 1 in the above described basic manner.

As to be described later, the buttons 14R, 14L in this example can become concaved, that is, move downward, relative to the top surface 11c. The rear touch panel 21 is positioned from the buttons 14R, 14L in a diagonally downward direction, and therefore a user can touch the rear touch panel 21 with the index fingers when moving diagonally the index finger on the buttons 14R, 14L in a press direction.

In this example, the rear touch panel 21 is offset upward relative to the stick position P. That is, the rear touch panel 21 is located in an area expanding from the line L, which is a line extending in the left-right direction and passing the stick positions P, toward the upper edge of the rear surface. As a result, the center C1 in the up-down direction of the rear touch panel 21 is positioned further upward than the line L. With this arrangement of the rear touch panel 21, a user is not required to extend his/her finger placed on the rear surface downward. Accordingly, a user can stably hold the electronic device 1 even when using the touch panel 21. Note that the lower edge of the rear touch panel 21 is positioned slightly lower than the line L.

Note that, the area where the rear touch panel 21 is located is not limited to the above described area, and the area may expand largely from the line L toward the lower edge of the rear surface. That is, it is fine that the rear touch panel 21 is provided in at least an area located further upward than the stick position P.

As shown in FIG. 4, as the area where the rear touch panel 21 is located is offset toward one side in the up-down direction relative to the center C2 in the up-down direction of the electronic device 1. That is, the center C1 in the up-down direction of the rear touch panel 21 is positioned further upward than the center C2. Thus, the distance D1 between the lower edge of the rear touch panel 21 and the lower surface 11b of the electronic device 1 is longer than the distance D2 between the upper edge of the rear touch panel 21 and the upper surface 11c of the electronic device 1. In other words, the center C2 in the up-down direction of the electronic device 1 is positioned further lower than the center C1 in the up-down direction of the rear touch panel 21. Therefore, an area without the rear touch panel 21 is ensured in a lower part of the rear surface of the electronic device 1. The up-down width of the lower part area is larger than that of the area located further upward than the upper edge of the rear touch panel 21. This arrangement of the rear touch panel 21 can utilize the lower part of the electronic device 1 for arranging electronic components inside the electronic device 1.

As shown in FIG. 3 or 4, a flat surface (hereinafter referred to as a lower flat surface 23a) is formed in an area lower than the rear touch panel 21. The lower flat surface 23a defines the substantially same plane as the surface of the area of the rear touch panel 21 (the surface of the rear cover panel 13). No projecting operative member (e.g., a button) is provided on the lower flat surface 23a. This formation enables a user to largely move his/her finger up and down on the rear touch panel 21. The lower flat surface 23a expands from the lower edge of the area of the rear touch panel 21 to the lowermost part of the rear surface of the electronic device 1, and has a left-right width substantially identical to that of the rear touch panel 21.

In one example of the electronic device 1, a part of the surface of the rear cover panel 13 functions as the lower flat surface 23a. In another example, a plate where various information (product name or the like) about the electronic device 1 are described may be attached in the area lower than the rear touch panel 21, and the surface of the plate may function as the lower flat surface 23a. That is, the surface of the plate and that of the area of the rear touch panel 21 may constitute the same plane.

The width of the rear touch panel 21 is smaller than that of the display area 2. As a result, the degree of freedom in laying out components arranged in the electronic device 1 can be increased, while ensuring a sufficient size for the display area 2. For example, the electronic device 1 includes a plurality of antennas for radio communication. The configuration where the rear touch panel 21 has a smaller width than the display area 2 facilitates an arrangement where the antennas are arranged away from both of the rear touch panel 21 and the touch panel constituting the display area 2. Specifically, the antennas can be readily arranged in positions not overlapping the rear touch panel 21 in the thickness direction (the direction indicated by Z1-Z2 in FIGS. 7 and 8) of the electronic device 1, while ensuring a sufficient distance between the antenna and the display area 2. This can improve stability in communication through the antenna.

In this example, as shown in FIGS. 2 and 4, the up-down width of the rear touch panel 21 is smaller than that of the display area 2, and the rear touch panel 21 is offset upward relative to the display area 2. That is, the center C1 in the up-down direction of the rear touch panel 21 is positioned further upward than the center in the up-down direction of the display area 2. Therefore, a component such as an antenna or the like can be accommodated in the lower part of the electronic device 1.

Meanwhile, the left-right width of the rear touch panel 21 is substantially equal to that of the display area 2. With this design, the distance between the left/right edge of the electronic device 1 and the rear touch panel 21 can be prevented from becoming large. As described above, the up-down width of the rear touch panel 21 is smaller than that of the display area 2, and the left-right width of the rear touch panel 21 is equal to that of the display area 2. As a result, layout of components in the electronic device 1 can be facilitated, and operability of the rear touch panel 21 can be prevented from being deteriorated.

The relationship between the width of the rear touch panel 21 and that of the display area 2 is not limited to the above. For example, the left-right width of the rear touch panel 21 may be larger than that of the display area 2. As a result, the left and right edges of the rear touch panel 21 are positioned closer to the respective hold parts 1R, 1L, which consequently improves operability of the rear touch panel 21. To the contrary, the left-right width of the rear touch panel 21 may be smaller than that of the display area 2. This arrangement facilitates laying out of a component to be arranged inside the hold parts 1R, 1L.

As shown in FIGS. 3 and 4, the electronic device 1 has a guide 12f formed on the rear surface thereof for guiding the area of the rear touch panel 21. The guide 12f is positioned to the right and left of the rear touch panel 21. In other words, the guide 12f is formed on the respective rear surfaces of the hold parts 1R, 1L. A user can recognize the area of the rear touch panel 21 by touching the guide 12f with his/her finger.

The rear touch panel 21 (the surface of the rear cover panel 13) has a flat surface. The surface of the guide 12f has a style different from the surface of the rear touch panel 21. For example, a concave portion and a convex portion are formed on the guide 12f. In detail, the entire guide 12f may be concave or convex, or a plurality of concave portions and convex portions may be formed on the guide 12f. Yet alternatively, the guide 12f may have a surface rougher than the rear touch panel 21. Further alternatively, the guide 12f may be made of a material different from that of the surface of the rear touch panel 21.

Figure 11:
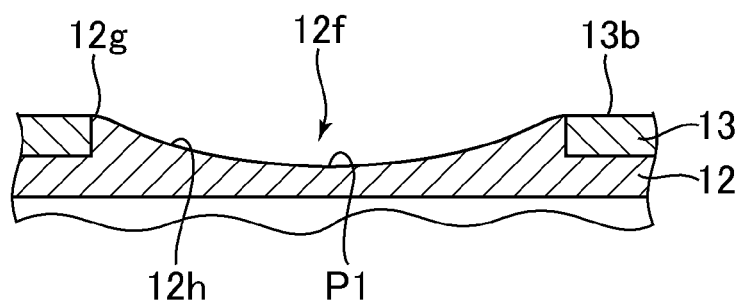
FIG. 11 is a cross sectional view of a guide of the electronic device, showing a cross section along the line XI-XI in FIG. 4.

FIG. 11 is a cross sectional view of the guide 12f to be described below of the electronic device 1, showing a cross section along the line XI-XI in FIG. 4. As shown in FIG. 11, the rear surface of the electronic device 1 is concaved in the guide 12f in this example. Accordingly, a user may readily rest his/her finger on the guide 12f when not using the rear touch panel 21. The guide 12f is surrounded by a flat surface 13b constituting the same plane as the surface of the rear touch panel 21.

As shown in FIG. 4, the rear touch panel 21 is surrounded by a groove 13g formed along the outer edge thereof. In this example, the groove 13g is formed along the upper, left, and right edges of the rear touch panel 21. The groove 13g as well can have a function of guiding a user the area of the rear touch panel 21.

As shown in FIG. 4, the guide 12f is offset downward relative to the rear touch panel 21. That is, the center in the up-down direction of the guide 12f is positioned further lower than the center C1 of the rear touch panel 21. The lower end of the guide 12f is positioned lower than the lower edge of the rear touch panel 21. Accordingly, the tip end of a middle finger placed on the rear surface can be more readily placed on the guide 12f. The guide 12f in this example is formed having a substantial oval shape that is long in the up-down direction, with the up-down width thereof substantially corresponding to that of the rear touch panel 21.

As shown in FIG. 11, the rear surface of the electronic device 1 includes a slope 12h formed between the deepest position P1 of the guide 12f and the edge 12g of the guide 12f toward the rear touch panel 21. With this structure a finger resting on the guide 12f can be readily moved toward the rear touch panel 21. In this example, the surface of the guide 12f is curved in a cross section thereof. Specifically, the cross section of the guide 12f presents an arc shape open rearward of the electronic device 1. The slope 12h constitutes a part of the curved surface.

As shown in FIG. 4, a space is ensured between the guide 12f and the left/right edge of the area where the rear touch panel 21 is located. That is, the edge 12g of the guide 12f toward the rear touch panel 21 is positioned away from the left/right edge of the rear touch panel 21. This structure can prevent a finger resting on the guide 12f from erroneously touching the rear touch panel 21.

Further, the surface of the guide 12f is made of a material different from the material forming the surface of the area of the rear touch panel 21. In this example, as shown in FIG. 11, the guide 12f is integrally formed with the rear housing 12. The rear cover panel 13 has an opening formed in a position corresponding to the guide 12f, and a part of the rear housing 12 is exposed in the opening. The exposed part constitutes the guide 12f. Meanwhile, the flat surface 13b surrounding the guide 12f is formed by the rear cover panel 13.

As shown in FIGS. 3 and 4, the rear cover panel 13 is slightly smaller in size than the rear housing 12 in the rear view of the electronic device 1. Specifically, in this example, the up-down width of the rear cover panel 13 is smaller than that of the rear housing 12, and consequently, the uppermost part 12c of the rear housing 12 is positioned further upward than the upper edge of the rear cover panel 13. As shown in FIG. 7 or 8, a step K is formed between the edge of the uppermost part 12c of the rear housing 12 and the upper edge of the rear cover panel 13. In other words, the surface of the rear cover panel 13 is positioned slightly rearward than the edge of the uppermost part 12c of the rear housing 12. With this structure, a user can recognize the area of the rear touch panel 21 by touching the step K when moving his/her finger from the uppermost part 12c toward the rear touch panel 21.

In this example, as shown in FIG. 4, the left-right width of the rear cover panel 13 is smaller than that of the rear housing 12. Therefore, the outer circumferential part of the rear housing 12 surrounds the rear cover panel 13. The step K is formed between the outer circumferential part of the rear housing 12 and the outer circumferential edge of the rear cover panel 13.

As shown in FIGS. 1, 5, and 6, the leftmost part 12L and rightmost part 12R of the rear surface of the electronic device 1 are curved. That is, the rear surface has a curved surface located in the leftmost part 12R and the rightmost part 12L and curved toward the front surface of the electronic device 1. The curved surface of the leftmost part 12L is curved such that it becomes closer to the front surface of the electronic device 1 as it goes leftward. Similarly, the curved surface of the rightmost part 12R is curved such that it becomes closer to the front surface of the electronic device 1 as it goes rightward. With this structure, a user can more readily support the rear surface of the electronic device 1, compared to a structure in which each of the rightmost part 12R and the leftmost part 12L has a sharp angle.

As shown in FIG. 7, the uppermost part 12c of the rear surface as well is curved. That is, the rear surface includes a curved surface located in the uppermost part 12c and curved toward the front surface of the electronic device 1. The curved surface of the uppermost part 12c is curved such that it becomes closer to the front surface of the electronic device 1 as it goes upward. With this structure, a user can smoothly move his/her finger from the upper surface 11c of the electronic device 1 toward the rear touch panel 21. In this example, the lowermost part 12d of the rear surface as well is curved toward the front surface of the electronic device 1.

As described above, the rear surface of the electronic device 1 includes, in the outer circumferential part thereof, a curved surface curved toward the front surface of the electronic device 1. In this example, the curved surface is formed over the entire circumference of the rear surface. The rear touch panel 21 and the guide 12f are positioned in the area enclosed by the outer circumferential part. The curved outer circumferential part is formed by the rear housing 12. That is, the rear housing 12 is formed like a plate of which edge is curved toward the front surface of the electronic device 1.

The outer edge of the outer circumferential part of the rear housing 12 (that is, the uppermost part 12c, the lowermost portion 12d, the rightmost part 12R, and the leftmost part 12L) continues to the top surface 11c, lower surface 11b, right side surface 11R, and left side surface 11L of the front housing 11. As shown in FIG. 5, the height H1 of the curved surface formed on the outer circumferential part is slightly larger than the height H2 of the upper surface 11c or the like. Further, the width W of the curved surface is slightly larger than the height H1 of the curved surface.

As shown in FIG. 3 or 4, a camera 24 is provided on the rear side of the electronic device 1. Specifically, in this example, the camera 24 is positioned on the uppermost part 12c at the center in the left-right direction of the electronic device 1. The front surface of the camera 24 is positioned concaved relative to the rear surface of the electronic device 1 (the surface of the rear cover panel 13). Therefore, when the electronic device 1 is placed on a surface, the front surface of the camera 24 is positioned away from the surface (the surface where the electronic device 1 is placed), so that the front surface of the camera 24 can be prevented from getting dirt.

A plurality of operative members are provided on the surface forming the outer circumference of the electronic device 1 (specifically, the right side surface 11R, the left side surface 11L, the top surface 11c, and the lower surface 11b of the front housing 11, all hereinafter collectively referred to as a circumferential surface). These operative members on the circumferential surface are arranged avoiding the right side surface 11R and the left side surface 11L. With this arrangement, a user can be prevented from erroneously moving the operative member when holding the hold parts 1R, 1L. In this example, as shown in FIG. 6, the button 8a, 8b, 8c are provided on the top surface 11c. The button 8a is, e.g., a power button, and the buttons 8b, 8c are, e.g., sound volume buttons.

As shown in FIG. 6, the electronic device 1 includes covers 15a, 15b constituting a part of the upper surface 11c. A slot for insertion of a card-type recording medium storing, e.g., a program for a game is formed inside the cover 15a. The cover 15a covers the slot. Meanwhile, a terminal (e.g., a USB terminal) for connection of an accessory and a peripheral device of the electronic device 1 is formed inside the cover 15b. The cover 15b covers the terminal.

As shown in FIG. 3, the electronic device 1 includes a cover 15c constituting a part of the curved surface 12L. A slot for insertion of a card-type recording medium is formed inside the cover 15c. The cover 15c covers the slot.

Terminals 16a, 16b for connecting with a terminal of an external device are provided on the circumferential surface of the electronic device 1. Specifically, the terminals provided on the circumferential surface are all arranged avoiding the right side surface 11R and the left side surface 11L. More specifically, as shown in FIG. 5, the terminals 16a, 16b are provided on the lower surface 11b. The terminal 16a is a power terminal or a USB terminal for connection of a charge device for charging the battery of the electronic device 1. The terminal 16b may be, e.g., a terminal of a headphone or a microphone. A cover 15d is provided on the curved surface of the lowermost part 12d, and a slot for insertion of a card-type storage medium is formed inside the cover 15d. The cover 15d covers the slot. The cover 15d is curved and constituting a part of the curved surface of the lowermost part 12d.

As shown in FIGS. 1 and 2, the button 14R is provided at the rightmost position of the top surface 11c (in other words, the uppermost position of the right side surface 11R). The button 14L is provided at the leftmost position of the same (in other words, the uppermost position of the left side surface 11L). As shown in FIG. 9, a user can hook his/her index fingers on the respective buttons 14R, 14L, while holding the hold parts 1R, 1L. The buttons 14R, 14L can move so as to be concaved relative to the top surface 11c. That is, the buttons 14R, 14L can move downward.

As shown in FIG. 2, the top surfaces (a surface pressed by a finger) of the buttons 14R, 14L are curved in conformity with the right side surface 11R and the left side surface 11L, respectively. In other words, the top surface of the button 14R is flush with the right side surface 11R. The edge of the button 14R and the right edge of the front housing 11 together make a substantially semi-circular shape as a whole in the front view of the electronic device 1. Similarly, the top surface of the button 14L is flush with the left side surface 11L, and the edge of the button 14L and the left edge of the front housing 11 together make a substantially semi-circular shape as a whole in the front view of the electronic device 1. Therefore, as shown in FIG. 9, a user's index fingers with tip end thereof resting on the respective buttons 14R, 14L are moderately bent. As a result, a user can readily extend his/her other finger (specifically, the middle finger) placed on the rear surface of the electronic device 1 toward the rear touch panel 21.

As described above, according to the electronic device 1, the rear touch panel 21 is provided in an area located further upward than the positions P opposite from the operation sticks 3R, 3L provided on the hold parts 1R, 1L, respectively. This arrangement enables a user to smoothly operate the rear touch panel 21, while holding the hold parts 1R, 1L.

Further, the rear touch panel 21 is offset upward relative to the operative sticks 3R, 3L. According to this layout, a user is not required to extend his/her finger placed on the rear surface toward the lower part of the electronic device 1, and therefore can stably hold the electronic device 1.

Each operative stick 3R, 3L is movable in the radius directions around the respective operative stick 3R, 3L. As input of a direction instruction using the operative sticks 3R, 3L is easy, a user may keep his/her fingers placed on the respective operative sticks 3R, 3L at most of the time. Therefore, formation of the rear touch panel 21 in an area above the positions opposite from the respective operative sticks 3R, 3L allows a user to smoothly operate the rear touch panel 21 in the more number of scenes for use.

The rear surface of the electronic device 1 has the guide 12f for guiding a user the area where the rear touch panel 21 is located. This structure can prevent erroneous touching the rear touch panel 21 by a user's finger. Note that the guide 12f may be formed on a member that constitutes the rear surface of the electronic device 1 (e.g., the housing or the cover that constitutes the rear surface of the electronic device 1), or a member different from a member constituting the rear surface of the electronic device 1 may be provided as a guide.

A space is ensured between the guide 12f and the area where the rear touch panel 21 is provided. The space can prevent a user's finger from erroneous touching the rear touch panel 21.

The surface of the guide 12f has a style different from that of the surface of the area where the rear touch panel 21 is located. With this structure, erroneous touching the rear touch panel 21 by a user's finger can be more reliably prevented.

Further, the rear surface of the electronic device 1 is concaved in the guide 12f. With this structure, a user can rest his/her finger in the concave portion when not intending to use the rear touch panel 21, to thereby avoid erroneous touching the rear touch panel 21.

The rear surface of the electronic device 1 has the slope 12h between the deepest position P1 of the guide 12f and the edge 12g of the guide 12f toward the rear touch panel 21. The slope 12h can prevent a user's finger from being caught on the edge 12g of the guide 12f. Consequently, a user can smoothly extend his/her finger toward the rear touch panel 21.

The material constituting the surface of the guide 12f differs from that of the surface of the area where the rear touch panel 21 is located. With this structure, erroneous touching the rear touch panel 21 by a user's finger can be more readily prevented.

The width (the up-down width in the above description) of the rear touch panel 21 is smaller than that of the display area 2. This structure facilitates layout of components (e.g., an antenna) that require a sufficient distance from both of the display area 2 and the rear touch panel 21, while ensuring a sufficient size for the display area 2.

The rear touch panel 21 is offset upward relative to the center C2 in the up-down direction of the electronic device 1. This arrangement of the rear touch panel 21 facilitates layout of components arranged inside the electronic device 1.

The outer circumferential part of the rear surface of the electronic device 1 is curved toward the front. With this structure, a user can more readily place his/her finger on the rear surface of the electronic device 1.

The rear surface includes a flat surface continuing downward from the surface of the area where the rear touch panel 21 is located. With this structure, a user can more readily move his/her finger largely in the up-down direction on the rear touch panel 21 as the finger is not caught on the edge of the rear touch panel 21.

The edge of each hold parts 1R, 1L is curved into a semi-arc shape in the front view of the electronic device 1. With this shape of the hold part 1R, 1L, a user can more readily move his/her finger on the rear surface of the electronic device 1, while holding the hold parts 1R, 1L.

Note that the present invention is not limited to the above described electronic device 1, and various modifications are possible.

For example, the present invention may be applied to a portable electronic device (a game device) that includes an upper enclosure and a lower enclosure capable of being opened and closed. In this case, an operative member may be provided on the lower enclosure, and a rear touch panel may be provided on the rear surface of the upper enclosure.

Further, the left and right edges of the electronic device 1 may not be curved as such. That is, the electronic device 1 may be formed into a substantial rectangular solid.

Further, although the operative sticks 3R, 3L are provided to the left and right of the display area 2, respectively, in the electronic device 1, the operative stick may be provided only to one of the right and left of the display area 2.

Further, the rear cover panel 13 is provided on the outermost surface of the rear touch panel 21, and the surface of the area of the rear touch panel 21 is flush with the area surrounding the touch panel 21. However, a step may be formed between the area of the rear touch panel 21 and the surrounding area.

Further, although the rear touch panel 21 is offset upward relative to the display area 2 in the above description, the rear touch panel 21 may be provided in a position directly opposite from the display area 2. Further, although the rear touch panel 21 is offset upward relative to the electronic device 1, the center C1 in the up-down direction of the rear touch panel 21 may coincide with the center C2 in the up-down direction of the electronic device 1.

What is claimed is:

1. A portable electronic device, comprising:
an area defined in a front surface of the electronic device and provided with a touch panel; and
a first operative stick projecting from the front surface of the electronic device on a first lateral side of the touch panel;
at least a first operative button disposed proximate to the first operative stick;
a second operative stick projecting from the front surface of the electronic device on a second, opposite, lateral side of the touch panel;
at least a second operative button disposed proximate to the second operative stick; wherein:
the front surface of the electronic device includes an upper flat surface continuing upward from the area and flush with at least a part of the area, and
a lower flat surface continuing downward from the area and flush with at least a part of the area.

2. The portable electronic device according to claim 1, wherein the upper flat surface reaches an upper edge of the front surface of the electronic device.

3. The portable electronic device according to claim 1, wherein the lower flat surface reaches a lower edge of the front surface of the electronic device.

4. The portable electronic device according to claim 1 further comprising a front cover panel covering the touch panel and forming the front surface of the electronic device.

5. The portable electronic device according to claim 1, wherein the upper flat surface is flush with at least the part of the area between the first operative stick and the second operative stick.

6. The portable electronic device according to claim 1, wherein the lower flat surface is flush with at least the part of the area between the first operative stick and the second operative stick.

* * * * *